United States Patent
Zhuang et al.

(10) Patent No.: US 8,045,179 B1
(45) Date of Patent: Oct. 25, 2011

(54) BRIGHT AND DARK FIELD SCATTEROMETRY SYSTEMS FOR LINE ROUGHNESS METROLOGY

(75) Inventors: Guorong Vera Zhuang, Santa Clara, CA (US); Steven R. Spielman, Oakland, CA (US); Leonid Poslavsky, Belmont, CA (US); Daniel C. Wack, Los Altos Hills, CA (US); John Fielden, Los Altos, CA (US)

(73) Assignee: KLA-Tencor Corporation, San Jose, CA (US)

( * ) Notice: Subject to any disclaimer, the term of this patent is extended or adjusted under 35 U.S.C. 154(b) by 365 days.

(21) Appl. No.: 12/275,078

(22) Filed: Nov. 20, 2008

Related U.S. Application Data

(60) Provisional application No. 61/084,908, filed on Jul. 30, 2008.

(51) Int. Cl.
*G01B 11/30* (2006.01)
(52) U.S. Cl. ......................................... 356/600; 356/601
(58) Field of Classification Search .......... 356/600–601, 356/237.1–237.6, 239.7, 445–448; 382/141; 702/155, 166–167
See application file for complete search history.

(56) References Cited

U.S. PATENT DOCUMENTS

| | | | |
|---|---|---|---|
| 5,608,527 A * | 3/1997 | Valliant et al. | ................ 356/600 |
| 5,880,845 A | 3/1999 | Leroux | |
| 6,801,309 B1 | 10/2004 | Nelson | |
| 6,804,001 B1 | 10/2004 | Leroux | |
| 7,184,152 B2 | 2/2007 | Brill | |
| 7,286,243 B2 | 10/2007 | Rosencwaig | |
| 2007/0064247 A1 | 3/2007 | Petit | |

FOREIGN PATENT DOCUMENTS

| | | |
|---|---|---|
| EP | 1640706 | 3/2006 |
| EP | 1657580 | 5/2006 |

OTHER PUBLICATIONS

P. Boher et al. "Innovative Rapid Photo-goniometry method for CD metrology" Metrology, Inspection, and Process Control for Microlithography XVIII, Proceedings of SPIE vol. 5375 (SPIE, Bellingham, WA, 2004), pp. 1302-1313.

P. Boher et al. "Optical Fourier Transform Scatterometry for LER and LWR metrology" Metrology, Inspection, and Process Control for Microlithography XIX, Proc. of SPIE vol. 5752 (SPIE, Bellingham, WA, 2005), pp. 192-203.

Frank Scholze et al. "The influence of line edge roughness and CD uniformity on EUV scatterometry for CD characterization of EUV masks" Modeling Aspects in Optical Metrology, Proc. of SPIE vol. 6617, 66171A, (2007).

(Continued)

*Primary Examiner* — Tri T Ton
(74) *Attorney, Agent, or Firm* — Joshua D. Isenberg; JDI Patent

(57) ABSTRACT

Line edge roughness or line width roughness of a feature on a sample may be determined from incident radiation scattered from the feature. An amount of ordered scattered radiation characterized by a discrete diffraction order is determined and a diffuse scattered radiation signal is measured. A ratio between an intensity of the ordered scattered incident radiation and an intensity of the diffuse scattered radiation signal is determined. The line edge roughness or line width roughness is determined from the ratio.

25 Claims, 6 Drawing Sheets

OTHER PUBLICATIONS

Thomas A. Germer "Effect of line and trench profile variation on specular and diffuse reflectance from a periodic structure" Optical Technology Division, National Institute of Standards and Technology, J. Opt. Soc. Am. A vol. 24, No. 3, Mar. 2007, pp. 696-701.

J. Foucher "CD-AFM vs CD-SEM for resist LER and LWR measurements" Metrology, Inspection, and Process Control for Microlithography XX, Proc. of SPIE vol. 6152, 61520V, (2006).

Chengqing Wang et al. "Line edge roughness characterization of sub-50nm structures using CD-SAXS: Round-robin benchmark results" Metrology, Inspection, and Process Control for Microlithography XXI, Proc. of SPIE vol. 6518, 651810, (2007).

Qinghuang Lin et al. "Does Line Edge Roughness Matter?: FEOL and BEOL Perspectives" Advances in Resist Technology and Processing XX, Proceedings of SPIE vol. 5039 (2003), pp. 1076-1085.

J. Thiault et al. "Line edge roughness characterization with a three-dimensional atomic force microscope: Transfer during gate patterning processes" J. Vac. Sci. Technol. B 23(6) Nov./Dec. 2005, pp. 3075-3079.

Barak Yaakobovitz et al "Line edge roughness detection using deep UV light scatterometry" Department of Chemical Engineering, Technion —Israel Institute of Technology, Microelectronic Engineering 84 (2007) pp. 619-625.

Chengqing Wang et al. "Characterization of correlated line edge roughness of nanoscale line gratings using small angle x-ray scattering" Journal of Applied Physics 102, 024901 (2007).

Chengqing Wang et al. "Small angle x-ray scattering measurements of lithographic patterns with sidewall roughness from vertical standing waves" Applied Physics Letters 90, 193122 (2007).

\* cited by examiner

BRIGHT AND DARK FIELD SCATTEROMETRY SYSTEMS FOR LINE ROUGHNESS METROLOGY

CLAIM OF PRIORITY

This application claims the benefit of priority of commonly-assigned co-pending U.S. Patent Application No. 61/084,908, entitled "BRIGHT AND DARK FIELD SCATTEROMETRY SYSTEMS FOR LINE ROUGHNESS METROLOGY", filed Jul. 30, 2008, the entire contents of which are incorporated herein by reference.

FIELD OF INVENTION

This invention relates to optical metrology systems and more particularly to optical metrology systems, for measuring line width roughness (LWR) and line edge roughness (LER).

BACKGROUND OF INVENTION

It has been shown that the line width roughness (LWR) and line edge roughness (LER) of the features of a device have an impact on the device performance. As the critical dimensions (CD) of devices shrink to 35 nm and below, control and monitoring of LWR and LER become increasingly more critical. For example, nano-scale LER and LWR have a significant impact on transistor performance and on the performance and reliability of advanced interconnects. Specifically, the roughness on the sidewall of a dielectric feature of a back end of line (BEOL) structure will transfer to a copper interconnect at the interface. As a result, the copper conductivity may be adversely affected because of the enhanced electron scattering. There are currently several viable techniques that measure LWR and LER, but most of them cannot be used in-situ with existing process control metrology tool.

Thus, there is need in the art, for a fast, nondestructive, noninvasive, and production worthy metrology tool, which is capable of meeting the process monitoring requirements for 32 nm nodes and beyond.

In prior art, attempts were made to measure LER and LWR by optical methods in dark-field, or combination of dark and bright field modes. (Microelectronic Engineering 84, 619 (2007); Proc. SPIE vol. 5752, 192 (2005)). However, the prior art fails to teach that the diffuse scattering depends on the roughness and the feature shapes and dimensions, and not just on the roughness alone. Thus the prior art does not provide sufficient teaching for quantitative interpretation of the signal in terms of the roughness.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

In an experiment based on the above-described concepts, selected structures were characterized by CD-SEM for critical dimension (CD) and LWR. A Dark-Field Two-Dimensional Beam Profile Reflectometry (DF-2 DBPR) was used to measure the low levels of diffuse scattered light from the roughness on the surfaces of the lines using 405-nm wavelength light and a 0.9 NA objective. The diffuse scattered light was collected in angular space ($\theta$, $\phi$) with the excitation light source polarization both parallel and perpendicular to the grating vector. The integrated diffuse scattered intensities obtained from structures with different CD and LWR values were compared to LWR as measured by CD-SEM. The diffuse scattered optical signal intensity showed a poor correlation to the CD-SEM measured LWR. However, a plot of the diffuse scattered intensity versus CD-SEM measured CD showed strong, but non linear, correlation. This showed that the scattering process depends not only on the surface roughness but also on the CD of the line (and presumably other details of the profile). Based on this discovery, a technique for determining line edge roughness and line width roughness was developed.

Figure 1A:
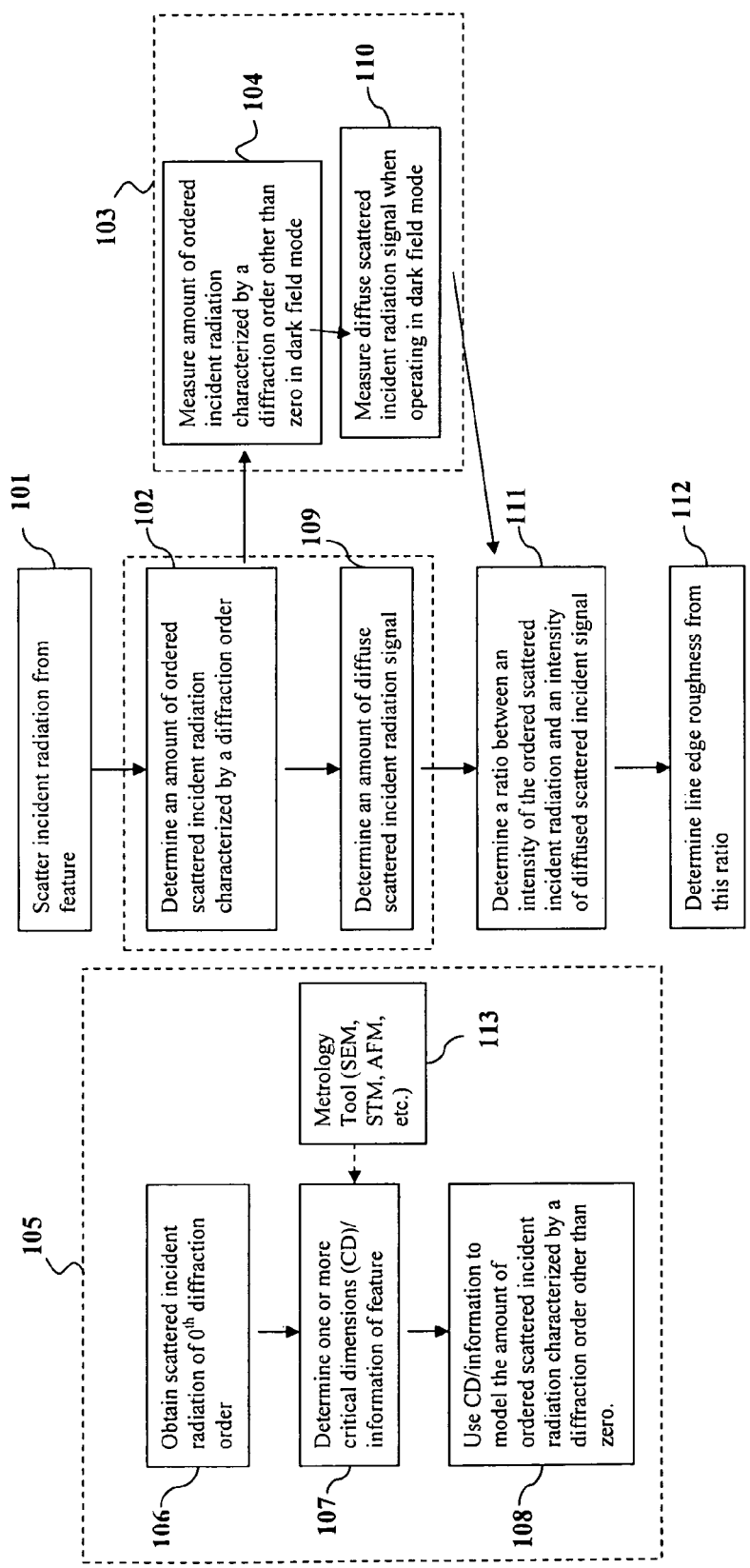
FIG. 1A is a flow diagram depicting a method for determining line edge roughness or line width roughness of a feature on a sample according to an embodiment of the invention.

FIG. 1A is a flow diagram describing the method in which the line edge roughness (LER) or line width roughness (LWR) of a feature on a sample is obtained. Initially, incident radiation from one or more radiation sources reaches the feature on the sample that is under consideration and this incident radiation is scattered after coming into contact with the feature as indicated at 101. The scattered incident radiation includes ordered scattered incident radiation and diffuse scattered incident radiation. The ordered scattered incident radiation is very directional in nature and may be regarded as diffraction of the incident radiation into one or more diffraction orders. These diffraction orders include, for example, $0^{th}$ order diffraction (specular reflection) and higher ordered diffraction, e.g., $1^{st}$ order, $2^{nd}$ order, and higher orders, which are scattered at diffraction angles that are different than the incident angle. The angle $\theta$, at which the diffraction order will be observed, may be described by the diffraction equation:

$$d^*(\sin\alpha\cos\beta - \sin\theta\cos\phi) = \pm n\lambda \ (n=0, 1, 2, \ldots)$$

where α and θ are, respectively, the incident and diffraction angles of the radiation relative to a normal to the sample surface and β and φ are, respectively, the incident and diffraction azimuthal angles relative to the orientation of the target grating pattern; d is the period of the structure; λ is the wavelength of the incident radiation and n is the diffraction order. The ordered diffraction tends to be characterized by relatively large intensity at and near scattering angles corresponding to the diffraction orders and relatively low to zero intensity at scattering angles in between the diffraction orders. The diffuse scattered incident radiation, by contrast, is more evenly distributed over a very wide range of scattering angles. The diffuse scattered incident radiation is generally much less intense at any given scattering angle than the ordered scattering is at the more prominent diffraction orders.

Figure 1B:
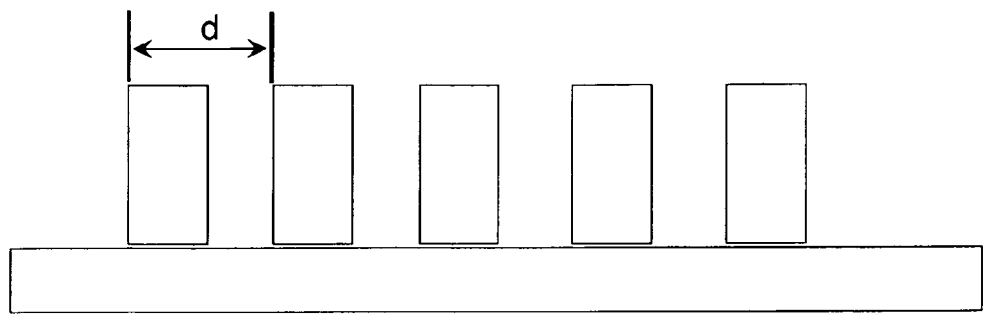
FIGS. 1B-1C illustrate how departures from ideal conditions might result in a grating period that is different from the intended pitch.
Figure 1C:
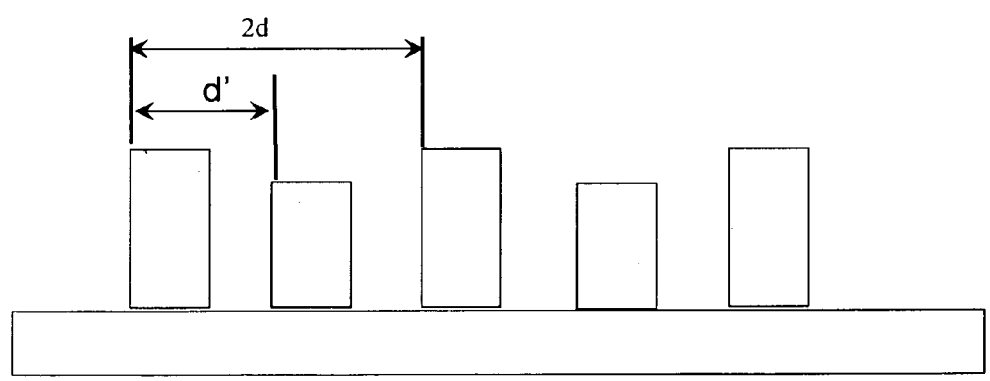

In practice real-world effects such as stitching artifacts in the photomask and departures from ideal conditions in the photolithography process can result in additional diffraction peaks less strong than the ordered diffraction peaks but much stronger than the diffuse scattering background. These additional peaks occur around angles that correspond to fractional values of n such as $\pm\frac{1}{2}$ or $\pm\frac{1}{2}$. These so-called fractional orders arise because the true period of the grating due to the aforementioned real-world effects is a small integer multiple of the intended pitch (2× the intended pitch in the case where the orders corresponds to values of n that are integer multiples of $\pm\frac{1}{2}$). Because the departures from ideal are small, the fractional orders are typically much weaker than the integer orders corresponding to the intended pitch. FIGS. 1B-1C illustrate this effect. FIG. 1B shows the ideal case where the cross-section of each line is the same. FIG. 1C shows a real-world case where every even-numbered line has essentially the same cross-sectional profile as every other even-numbered line, and similarly for the odd-numbered lines, but the odd and even line cross-sections differ slightly (in height in this illustration). Furthermore the spacing between the lines is not constant, but alternates between d' and 2d−d'. It is to be understood that the actual differences in cross-section could be any aspect of the shape including, but not limited to, height, width (CD) and side-wall angle. Either the separation of the lines or the cross section, or both, could be varying. The pattern could repeat every other line as illustrated or could repeat after a few lines, such as every third or every fourth line.

Embodiments of the present invention make use of the discovery that the line edge roughness or line width roughness apparently has an effect on how the scattered incident radiation is distributed between the ordered scattering and the diffuse scattering. In particular the line edge roughness or line width roughness of a feature may be determined from a ratio of an intensity of ordered scattered radiation for a discrete diffraction order to an intensity of diffuse scattered incident radiation.

An amount of ordered scattered incident radiation characterized by a discrete diffraction order, and an amount of diffused scattered radiation signal are determined as indicated at 102 and 109 respectively. One possible option for determining the amount of ordered scattered radiation and diffuse scattered radiation involves measuring the ordered scattered radiation with a reflectometry tool in a dark field mode as indicated at 103. In the dark field mode, incident radiation strikes the target at a narrow range of incidence angles, and the angular response of the ordered scattered radiation and the diffuse scattered radiation are measured either simultaneously or sequentially. Using the dark field mode, one can directly measure the amount of ordered scattered radiation characterized by a diffraction order other than zero as indicated at 104. One can also directly measure the amount of diffuse scattered radiation signal as indicated at 110. By way of example, the wavelength of the incident radiation, incident angle of the incident radiation, or polarization state of the incident radiation may be adjusted to optimize the measurement of the non-zero order scattered radiation and/or the diffuse scattered radiation.

Alternatively, the amount of zero and non-zero order scattered radiation may be determined from measurements with a spectroscopic and/or angle-resolved reflectometry tool, or a broadband spectroscopic and/or angle-resolved ellipsometer, operating in a bright field mode as indicated at 105. Bright field mode measurement involves directing incident radiation onto a sample at a broad range of incidence angles and collecting all scattered radiation whether it be ordered or diffuse. Once information relating to the scattered radiation is collected, the amount of zero order scattered radiation may be obtained from that information as indicated at 106. One or more critical dimensions (CD) of the feature on the sample may be obtained, e.g., from measurements of the $0^{th}$ diffraction order scattered radiation (i.e. the specular reflection of the incident radiation) as indicated at 107. Using the CD obtained from the $0^{th}$ diffraction order scattered radiation, the ordered scattering of the incident radiation characterized by a diffraction order other than zero may be modeled. Alternatively, CD information for relevant features of the sample may be obtained from other metrology tools 113, such as a scanning electron microscope (SEM), scanning tunneling microscope (STM), or atomic force microscope (AFM) tools.

Due to the relative low intensity of fractional diffraction orders, it is difficult to detect such scattering in bright-field mode. Yet the presence of such fractional diffraction orders provides important information about process variables such as mask alignment in double patterning and the precision of the lithography scanner. In combining the $0^{th}$ order scattered incident radiation determined, e.g., in bright field mode as indicated at 105 and fractional diffraction order scattered incident radiation determined, e.g., in dark field mode as indicated at 103, the critical dimensions of the structure can be more accurately modeled.

The critical dimensions and other information, such as the wavelength, intensity, and incident angle of the incident radiation and material properties and geometry of the sample feature may be used in a model to predict the non-zero order diffraction of the incident radiation as indicated at 108. The use of such modeling may be effective, e.g., if features that can be modeled predominate ordered scattering and the line edge roughness does not greatly affect the ordered scattering. By way of example, and not by way of limitation, the model may utilize the CD, height and other profile shape information such as side-wall angle, bottom notch and footing, and corner rounding to establish boundary conditions that are used by an electromagnetic equation algorithm to calculate the amount of radiation scattered in the non-zero diffraction order or orders of interest. The algorithm may use either numerical or analytical techniques to perform the calculation. The model may be updated from time to time based on the results of the measurements of the ordered scattering.

The amount of diffuse scattered radiation may be determined as indicated at 103. By way of example, the amount of diffuse scattered radiation may be measured directly using a reflectometry tool operating in the dark-field mode as indicated at 110. It is preferable to collect the diffuse scattered radiation in dark-field, rather than bright-field, mode because the diffuse scattered radiation is usually much weaker than the $0^{th}$ order diffracted radiation. A more accurate measurement of the weak diffuse signal can be made if the detector is not simultaneously illuminated by the strong $0^{th}$ order diffracted radiation. After obtaining both the ordered scattered radiation and the diffuse scattered incident radiation signal, a ratio of their intensities is determined as indicated at 111. The ratio of these intensities is then coupled with a correlation process to determine either the LER or LWR as indicated at 112. For example, LER or LWR may be independently determined for a known feature of the sample, e.g., through the use of atomic force microscopy (AFM), scanning electron microscopy (SEM) or some other techniques. The independently determined LER or LWR may then be correlated to ordered/diffuse scattering intensity ratios determined for the same feature. If large enough samples are compared over a broad enough range of LER or LWR, the ratio values may be calibrated corresponding to LER or LWR values.

Figure 2:
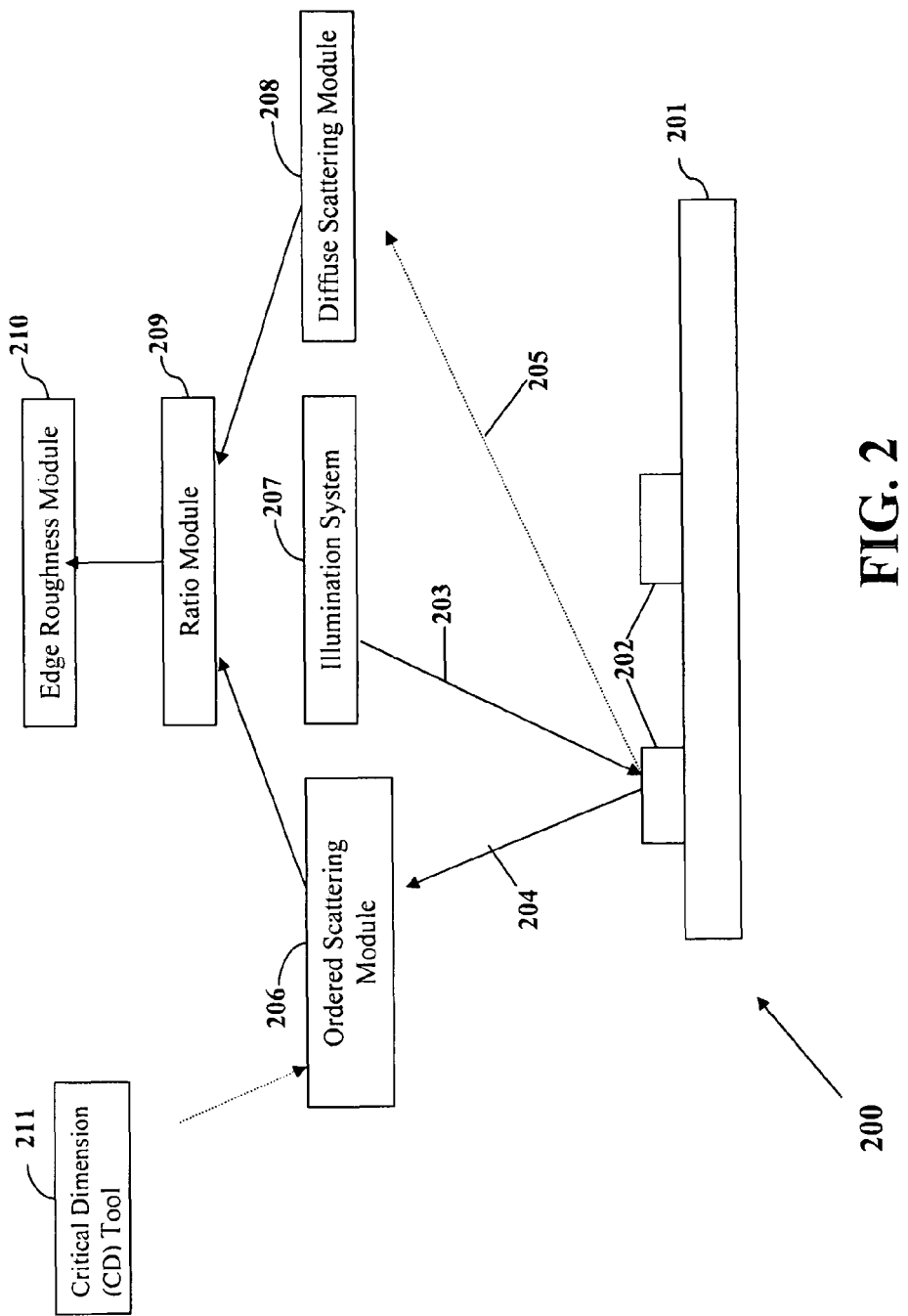
FIG. 2 is a block diagram depicting an apparatus for determining line edge roughness or line width roughness of a feature on a sample according to an embodiment of the invention.

FIG. 2 illustrates an apparatus 200 that may be used to determine LER or LWR in accordance with an embodiment of the present invention. The apparatus 200 includes an illumination system 207 configured to direct incident radiation 203 onto the feature 202 of the sample 201. The apparatus also includes an ordered scattering module 206 configured to determine an amount of ordered scattered radiation 204 leaving the feature 202 that is characterized by a discrete diffraction order. The apparatus 200 also includes a diffuse scattering module 208 configured to measure an amount of diffuse scattered radiation 205 leaving the feature 202. The information obtained by the ordered scattering module 206 and the diffuse scattering module 208 is further processed by a ratio module 209, which calculates a ratio of an intensity of non-zero order scattered radiation 204 to an intensity of the diffuse scattered radiation 205. An edge roughness module 210 determines the line edge roughness or line width roughness from the ratio calculated by the ratio module 209.

By way of example, and without limitation of embodiments of the invention, the illumination system 207 may include a collimated light source that is optically coupled to a high-NA microscope objective that directs incident radiation towards the feature of the sample. The illumination system 207 may also include a polarizer between the collimated light source and the high-NA microscope objective that acts to define the polarization state of the incident radiation that reaches the feature 202 of the sample 201. By adjusting the polarization state of the incident radiation, additional information about the line edge roughness or line width roughness may be obtained. For example, the line edge roughness may be due to periodic structures that run perpendicular to a linear feature on the sample. The amount of diffuse scattering from such features may depend heavily on whether the incident radiation is polarized perpendicular to the periodic structures or parallel to the periodic structures. Furthermore the illumination system 207 may include a lens array to focus the collimated light to the high-NA microscope objective. A pinhole aperture may be included between the polarizer and the high-NA microscope objective, to allow the apparatus to operate in dark field mode and then removed for bright field mode operation. The size of pinhole aperture could be adjustable, and/or its position could be adjustable to define a range of illumination angles, $\theta$ and $\phi$, over which the radiation is incident on the sample structure. The relative position of the pinhole, the polarization state of the incident radiation and the orientation of periodic structure could be adjusted with respect to each other in order to achieve the optimum sensitivity. Lastly a beam profile reflectometry beam splitter may be included between the lens array and the high-NA microscope objective to direct the scattered light collected by the microscope objective towards a detection system.

By way of example, and without limitation of embodiments of the invention, the ordered scattering module 206 may determine the amount of non-zero ordered scattered incident radiation in bright-field mode or dark-field mode. In bright-field mode, the incident radiation 203 reaches the feature 202 of the sample 201 at a wide range of incidence angles causing both ordered scattered incident radiation 204 and diffuse scattered incident radiation 205 to leave the feature 202. The $0^{th}$ diffraction ordered scattered incident radiation is filtered from the scattered radiation and used to determine one or more critical dimensions (CD) of the feature 202. Using the CD of the feature 202, a model is created to determine the amount of ordered scattered incident radiation characterized by a diffraction order other than zero. In dark-field mode, the incident radiation 203 reaches the feature 202 of the sample 201 at a very narrow range of incidence angles. By monitoring the angular response of the incident radiation, one can directly measure the amount of ordered scattered incident radiation characterized by a diffraction order other than zero and/or diffuse scattered radiation 205.

In some embodiments, the ordered scattering module 206 may determine the amount of ordered scattered incident radiation by applying a model based on one or more critical dimensions determined by some critical dimension tool 211 and/or other information, as discussed above.

By way of example, and without limitation of embodiments of the invention, the diffuse scattering module 208 may determine the amount of diffuse scattered incident radiation in dark-field mode by directly measuring the amount of diffuse scattered incident radiation 205 that is scattered upon the incident radiation reaching the feature 202 of the sample 201.

Information related to the amount of ordered scattered radiation and the amount of diffuse scattered radiation signal is fed to the ratio module 209. The ratio module 209 uses this information to determine the ratio between the intensity of the ordered scattered incident radiation characterized by a discrete diffraction order and the intensity of the diffuse scattered incident radiation signal.

Usually roughness such as LER or LWR is characterized by a broad range of spatial frequencies corresponding to length scales from around 1 nm or less to hundreds of nm or more. In some situations, LER or LWR may be dominated by a relatively narrow range of spatial frequencies. This can be caused, for example, by standing waves or interference effects during the lithographic exposure resulting in different absorbed doses of radiation in different locations in a relatively regular pattern. When the LER or LWR is characterized by a relatively narrow range of spatial frequencies, the diffuse scattering will tend to be concentrated around certain angles rather than being almost uniformly spread over a wide range of angles. In other words, the scattering due to the roughness will be largely in discrete orders, albeit ones corresponding to very different pitches than the ordered diffraction from the structure. In an alternative embodiment, the ratio module 209 could determine a ratio between the intensity of the ordered scattered incident radiation characterized by a diffraction order other than zero originating from the sample structure and the intensity of the ordered scattered incident radiation signal originated from LER and/or LWR using information about the spatial frequency of each component of scattered radiation. By way of example, choosing the plane of incidence parallel to grating line, i.e. perpendicular to the grating vector and s-polarization, the spatial frequency of each component of scattered radiation could be determined by converting imagery obtained in dark-field mode from angular space into momentum space.

Figure 4A:
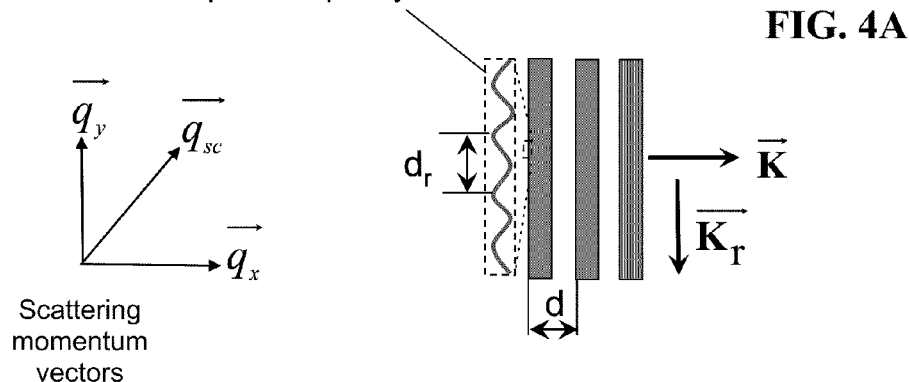
FIGS. 4A-4B illustrate a structure having a series of parallel lines with a roughness that is assumed to be approximately periodic along each of the lines.
Figure 4B:
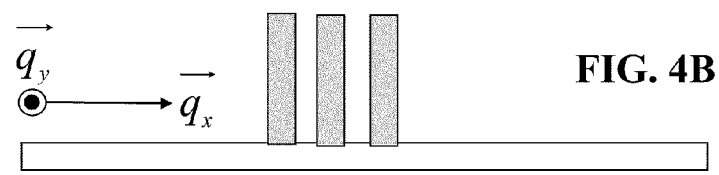

FIGS. 4A-4B illustrate a case where a structure consists of a series of parallel lines oriented in the y direction, so that the grating vector of the structure $\vec{K}$ is oriented in the x direction. The roughness is approximately periodic along each of the lines and hence the grating vector corresponding to the roughness will be oriented in the y direction (shown as $\vec{K}_r$ in the figure). A peak in the scattered light that is detected at angles $\theta_{sc}$, $\phi_{sc}$, where $\theta_{sc}$ is measured relative to the surface normal and where $\phi_{sc}$ is measured relative to the y axis.

In a case where the incident light is perpendicular to the main grating vector $\vec{K}$, the position of the peak in angular space $(\theta, \phi)$ can be converted into scattering momentum space $(q_{sc}(x), q_{sc}(y))$ via:

$$q_{sc}(x) = (\sin\theta_{sc}\cos\phi_{sc} - \sin\theta_i)/\lambda$$

$$q_{sc}(y) = \sin\theta_{sc}\sin\phi_{sc}/\lambda$$

where $\theta_i$ is the angle of incidence and $\lambda$ is the wavelength of the light.

In the case in which the roughness is predominantly along the length of the grating lines, the sample behaves like it has coherent orders in the directions indicated as $q_x$ and $q_y$. Therefore, decoupling of the orders in the $q_x$ and $q_y$ directions is valid as a $1^{st}$ order approximation, and the $q_y$ order relates primarily to the spatial frequency of the roughness while the $q_x$ order primarily relates to that of grating. If the peak of scattered light corresponds to orders m and n respectively in x and y momentum directions, then:

$$q_{sc}(x) = m/d$$

$$q_{sc}(y) = n/d_r$$

Finally, the edge roughness module 210 correlates the ratio obtained by the ratio module 209 to either the line edge roughness (LER) or the line width roughness (LWR) of the feature. By way of example, the edge roughness module 210 may compute the LER or LWR from a formula or table based on ratios obtained from calibration measurements of sample features having known LER or LWR.

Figure 3A:
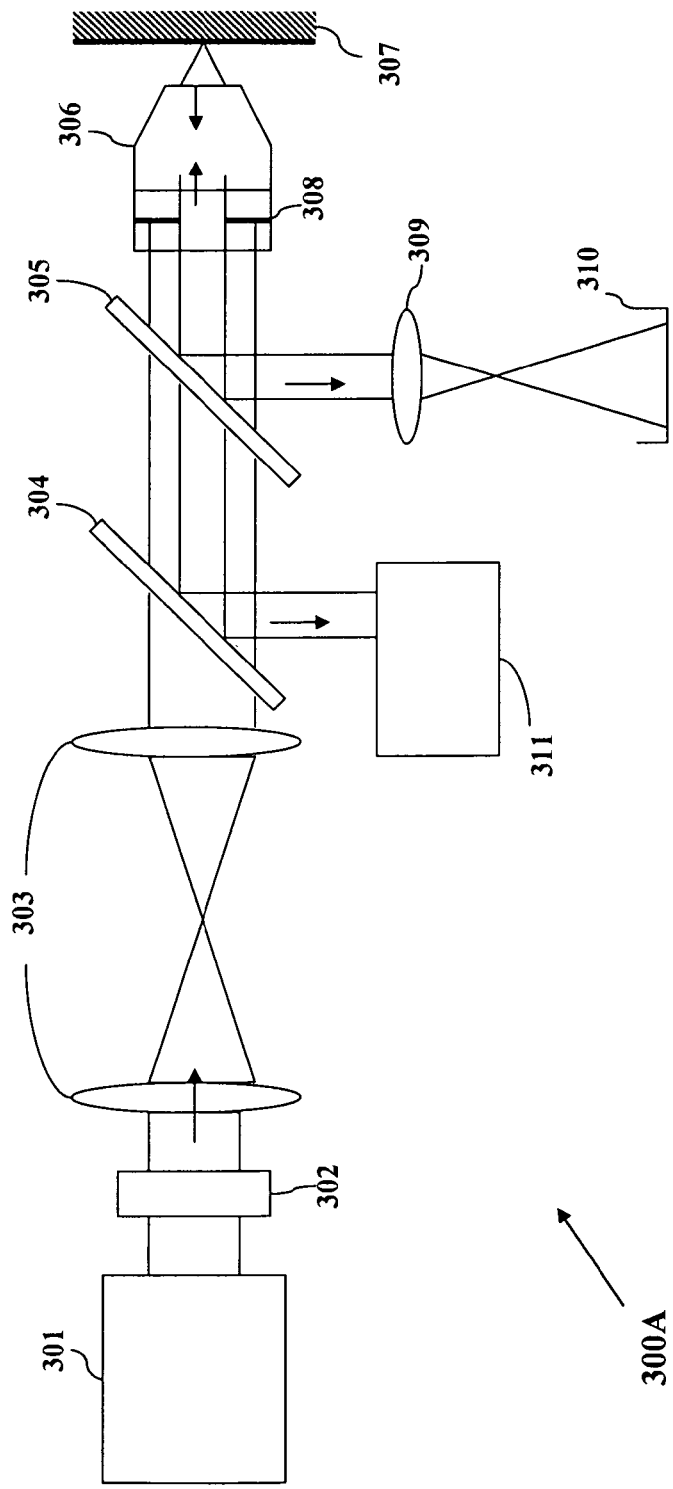
FIG. 3A is an illustration of an apparatus operating in bright-field mode to determine line edge roughness or line width roughness according to an embodiment of the present invention.

FIG. 3A illustrates an optical apparatus 300A for determining LER or LWR of a feature on a sample according to an embodiment of the current invention. The optical apparatus 300A may be used as a component of the ordered scattering module 206 and/or diffuse scattering module 208. The optical apparatus 300A is shown operating in bright-field mode. A collimated light source 301 produces a collimated beam of incident light. By way of example, the light source 301 may be a monochromatic source, such as a laser or a broadband source, such as an arc lamp or super continuum source. The light source 301 may be tunable, or may contain adjustable or selectable filters, such that a wavelength or selected range of wavelengths may be included or excluded from the incident light. Incident light from the collimated light source 301 illuminates the objective pupil 308 of the high-NA objective lens 306, which directs incident radiation at a feature or features on the sample 307. This collimated light first passes through a polarizer 302 and a lens assembly 303 before arriving at the objective pupil 308 of the high-NA objective lens 306. The polarizer 302 acts to define the polarization state of the light that is incident on the feature. The lens assembly 303 acts to direct the incident light towards the objective pupil 308 of the high-NA objective lens 306. Incident radiation that reaches the feature on the sample 307 is scattered as both ordered scattered radiation and diffuse scattered radiation. This scattered radiation passes back through the objective pupil 308 of the high-NA objective lens 306 before reaching a beam splitter 305. The beam splitter 305 diverts some of the returning light towards the detection path. This diverted light passes through a relay lens 309, which focuses the light towards the 2D array detector 310. The rest of the returning light passes through another beam-splitter 304, which diverts some of the returning light towards the auto-focus system 311. The 2D array detector 310, e.g., a charge-coupled device (CCD), converts the optical signal of the returning light into an electric signal to be further processed by a controller. In bright-field mode, the amount of ordered scattered incident radiation characterized by a zero or non-zero diffraction order can be modeled by determining one or more critical dimensions of the feature on the sample from the scattered returning light.

Figure 3B:
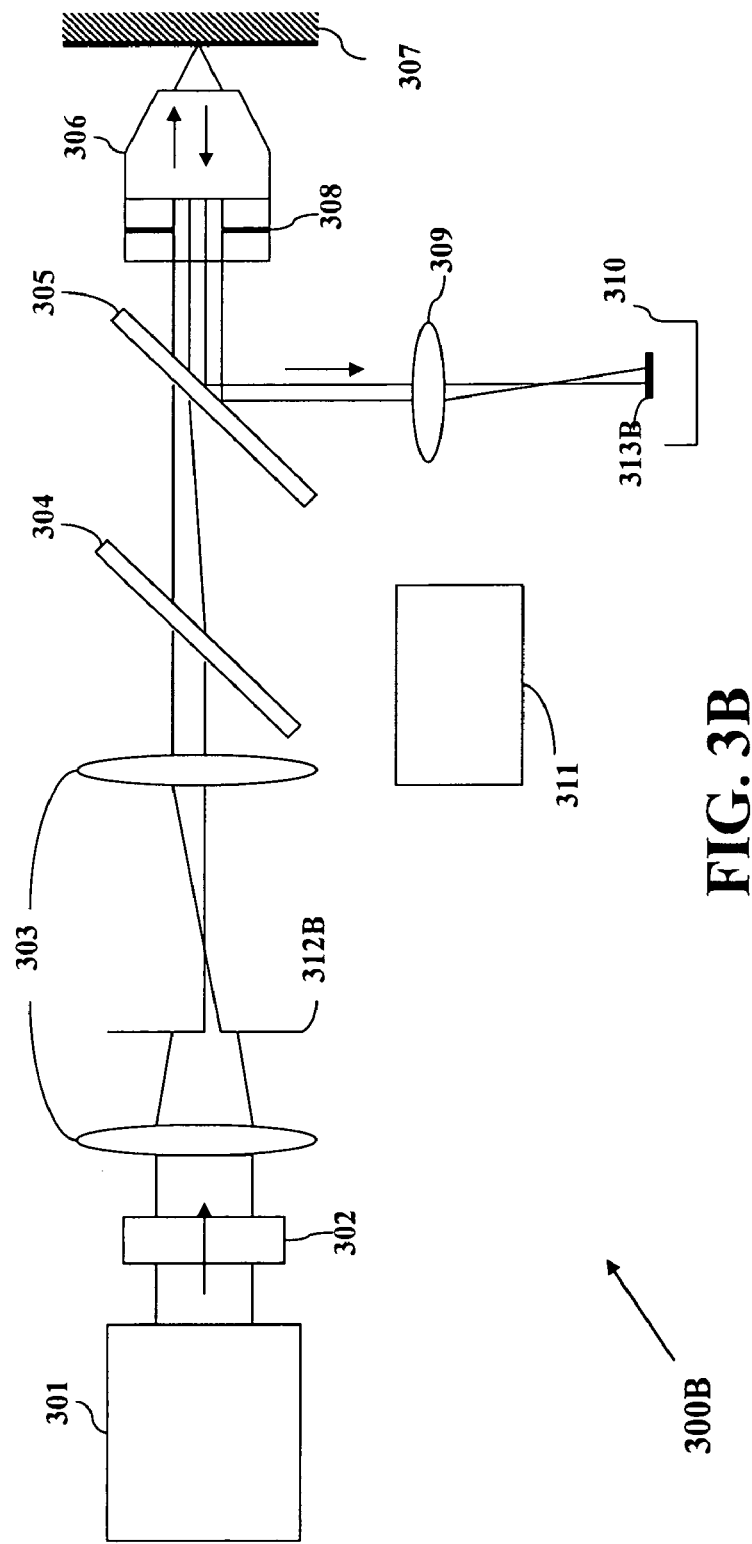
FIG. 3B is an illustration of the apparatus in FIG. 3A operating in dark-field mode to determine line edge roughness or line width roughness according to an embodiment of the present invention.

FIG. 3B illustrates an apparatus 300B for determining LER and LWR of a feature on a sample according to a variation of the embodiment depicted in FIG. 3A. The optical apparatus 300B shown is the same as that in FIG. 3A except that it is operating in dark-field mode rather than bright-field mode. A collimated light source 301 illuminates the objective pupil 308 of the high-NA objective lens 306, which directs incident radiation at a feature on the sample 307. This collimated light first passes through a polarizer 302, a lens assembly 303, and a pinhole aperture 312B before arriving at the objective pupil 308 of the high-NA objective lens 306. The polarizer 302 acts to define the polarization state of the light that becomes incident on the feature. In dark-field mode, the lens array 303 focuses the light that passes through the pinhole aperture 312B to the objective pupil 308 of the high-NA objective lens 306. The pinhole aperture 312B acts to narrow the range of incidence angles of the incident radiation that reaches the feature of the sample 307. By doing so, the amount of zero-order scattered returning light from the feature is restricted so that LER and LWR measurements can be more accurately obtained. The pinhole aperture 312B is part of the apparatus 300B, but is removed from the illumination path when operating in bright-field mode. Furthermore the position of pinhole aperture 312B may be adjustable to allow the optimum illumination angular ranges of incident angle $\theta$ and azimuth angle $\phi$ to be selected for a specific sample structure.

After the incident radiation reaches the feature of the sample 307, light is scattered, in the form of ordered scattered radiation and/or diffuse scattered radiation. This scattered light returns through the objective pupil 308 of the high-NA objective lens 306, before it reaches the beam splitter 305. The beam splitter 305 acts to divert the returning scattered light towards the detection path. This diverted returning scattered light passes through a relay lens 309 before reaching the $0^{th}$-order mask 313B. The $0^{th}$-order mask 313B functions to block $0^{th}$-order scattered incident radiation that arrives from the returning scattered light. The $0^{th}$-order mask 313B is not used in the bright-field mode operation of this apparatus. The rest of the scattered returning light not obstructed by the $0^{th}$-order mask 313B reaches a 2D detector array 310. The 2D detector array 310 is a charge-coupled device, or other array of light-sensitive detectors, that converts the optical signal found in the scattered returning light into electric signal to be processed by the controller. In dark-field mode, the amount of ordered scattered incident radiation characterized by a diffraction order other than zero and/or the diffuse scattered incident radiation can be directly measured from the scattered returning light that reaches the 2D detector array 310.

Figure 5:
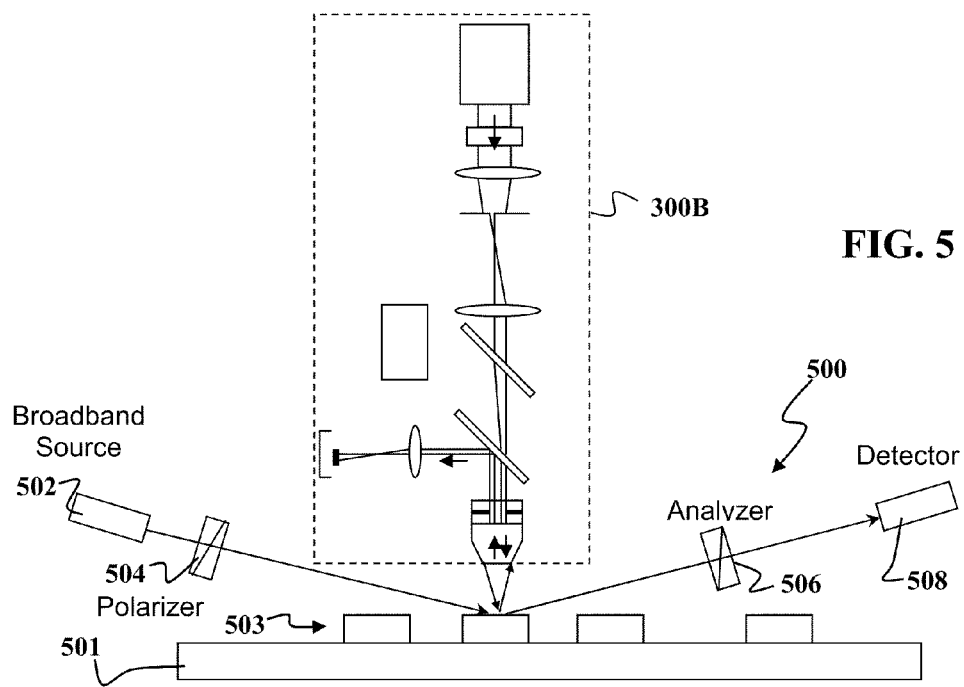
FIG. 5 is an illustration depicting use of a broadband spectroscopic ellipsometer an ordered scattering module in conjunction with an apparatus of the type shown in FIG. 3 to determine line edge roughness or line width roughness according to an embodiment of the present invention.

In another embodiment of the present invention a broadband spectroscopic ellipsometer 500 may be used instead of optical apparatus 300A as the Ordered Scattering Module as illustrated in FIG. 5. The optical apparatus 300B operating in dark field mode, as described above with respect to FIG. 3B, may be used as the Diffuse Scattering Module. The spectroscopic ellipsometer 500 may generally include a broadband radiation source 502 that is optically coupled to a polarizer 504. Broadband radiation from the source 502 is directed onto a target 501 at an incident angle θ. Incident radiation reflected and/or scattered from the target 501 passes through an analyzer 506, which may be another polarizer and is detected by a detector 508. The signal collected by spectroscopic ellipsometer 500, which tends to be dominated by $0^{th}$ order diffracted incident radiation, and may be used to characterize periodic structure in detail to obtain its profile, CD and/or height. This information may be used to calculate ordered diffraction which, in combination with the information from Diffuse Scattering Module 208, may be input into the Ratio Module 209, and from there to the Edge Roughness Module 210 to determine the LER and/or LWR of a sample structure 503 on the target 501.

The embodiment illustrated in FIG. 5 could also be used for more accurately modeling the sample structure, such as profile, CD, etc. For example, the fractional diffraction order intensity and angular position obtained from Diffuse Scattering Module 208 could be input into Critical Dimension (CD) Module 211 in processing signal from the Ordered Scattering Module 206. The processed information may be fed into the Ratio Module 209 to improve the sample structure 202 LER and/or LWR accuracy.

Embodiments of the present invention allow determination of line edge roughness and line width roughness using relatively non-invasive scatterometry techniques that may be implemented quickly in a production environment.

While the above is a complete description of the preferred embodiment of the present invention, it is possible to use various alternatives, modifications, and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for determining line edge roughness or line width roughness of a feature on a sample, comprising:
    a) directing incident radiation onto the feature;
    b) determining an amount of ordered scattered radiation leaving the feature characterized by a discrete diffraction order;
    c) measuring an amount of diffuse scattered radiation signal leaving the feature;
    d) determining a ratio between an intensity of the ordered scattered radiation and an intensity of the diffuse scattered radiation signal; and
    e) determining the line edge roughness or line width roughness from the ratio.

2. The method of claim 1, wherein a) includes directing incident radiation from a source of radiation onto the feature.

3. The method of claim 2, wherein b) includes measuring the amount of ordered scattered radiation through the use of dark field beam profile reflectometry.

4. The method of claim 3, wherein measuring the amount of ordered scattered radiation through the use of dark field beam profile reflectometry includes adjusting of one or more wavelengths of the incident radiation, an angle of incidence between the incident radiation and the feature, or a polarization state of the incident radiation.

5. The method of claim 3, wherein b) includes inserting an optical aperture between the source of radiation and the feature on the sample to narrow a range of incidence angles of the incident radiation that reaches the feature.

6. The method of claim 3, wherein b) includes measuring the amount of ordered scattered incident radiation characterized by a diffraction order other than zero and blocking $0^{th}$ order diffraction signals from being detected.

7. The method of claim 3, wherein c) includes measuring the amount of diffuse scattered radiation signal through bright field beam profile reflectometry.

8. The method of claim 3, wherein c) includes measuring the amount of diffuse scattered radiation signal through dark filed beam profile reflectometry.

9. The method of claim 8, wherein the measuring of the amount of diffuse scattered radiation signal includes the adjusting of one or more of the following: a wavelength of the incident radiation, an angle of incidence between the incident radiation and the feature, and a polarization state of the incident radiation.

10. The method of claim 2, wherein b) includes obtaining an amount of scattered radiation of $0^{th}$ diffraction order through bright field beam profile reflectometry to determine one or more critical dimensions of the feature and using the critical dimension to model the amount of order scattered radiation characterized by a diffraction order other than zero.

11. The method of claim 2, wherein b) includes obtaining an amount of scattered radiation of $0^{th}$ diffraction order through the use of a spectroscopic ellipsometer in order to determine one or more critical dimensions of the feature and then using the one or more critical dimensions to model the amount of ordered scattered radiation characterized by a diffraction order other than zero.

12. The method of claim 2, wherein b) includes obtaining an amount of scattered radiation of $0^{th}$ diffraction order through the use of a polarized broadband reflectometer to determine one or more critical dimensions of the feature and then using the one or more critical dimensions to model the amount of ordered scattered radiation characterized by a diffraction order other than zero.

13. The method of claim 2, wherein d) includes converting values representing the amount of scattered radiation characterized by a discrete diffraction order in b) and values representing the amount of diffuse scattered radiation signal in c) from angular space into scattering momentum space.

14. An apparatus for determining line edge roughness or line width roughness of a feature on a sample, comprising:
    a) an illumination system, having optics configured to direct radiation onto the feature of the sample;
    b) an ordered scattering module configured to determine an amount of ordered scattered radiation leaving the feature that is characterized by a discrete diffraction order;
    c) a diffuse scattering module configured to measure an amount of diffuse scattered radiation signal leaving the feature;
    d) a ratio module configured to determine a ratio between an intensity of the ordered scattered radiation characterized by a discrete diffraction order and an intensity of diffuse scattered radiation signal; and
    e) an edge roughness module configured to determine the line edge roughness or line width roughness of the feature on the sample using information from the ratio module.

15. The apparatus of claim 13, wherein the illumination system includes a collimated light source that illuminates a high-NA microscope objective, which directs radiation onto the feature of the sample.

16. The apparatus in claim 15, wherein the illumination system includes a beam profile reflectometry beam splitter (BPRBS) disposed between the light source and the objective, wherein the beam splitter is configured to transmit at least a portion of the directed radiation to the feature and divert a portion of the ordered scattered radiation and the diffuse scattered radiation to an array detector.

17. The apparatus in claim 16, wherein the illumination system includes a $0^{th}$ order mask between the BPRBS and the array detector that blocks $0^{th}$ ordered diffraction signals from reaching the array detector.

18. The apparatus in claim 16, wherein the illumination system includes a polarizer between the collimated light source and the high-NA microscope objective that defines the polarization state of the radiation that reaches the feature of the sample.

19. The apparatus of claim 18, wherein the illumination system includes a lens array between the polarizer and the high-NA microscope objective that focuses the radiation on the feature of the sample.

20. The apparatus of claim 19, wherein the illumination system includes a pinhole aperture between the polarizer and the high-NA microscope objective that is sized and positioned to narrow a range of incidence angles of the radiation that reaches the feature of the sample.

21. The apparatus of claim 14, wherein the ordered scattering module includes a detector array operable to measure the amount of ordered scattered radiation characterized by a diffraction order other than zero through dark field reflectometry.

22. The apparatus of claim 14, wherein the ordered scattering module includes a processor operable to determine one or more critical dimensions of the feature from bright field reflectometry measurements involving scattered radiation of $0^{th}$ diffraction order and use the one or more critical dimensions to model the amount of ordered scattered radiation characterized by a diffraction order other than zero.

23. The apparatus of claim 14, wherein the ordered scattering module includes a processor operable to determine one or more critical dimensions of the feature from spectroscopic ellipsometry measurements involving scattered of $0^{th}$ diffraction order and use the one or more critical dimensions to model the amount of ordered scattered radiation characterized by a diffraction order other than zero.

24. The apparatus of claim 14, wherein the ordered scattering module includes a processor operable to determine one or more critical dimensions of the feature from polarized broadband reflectometer measurements involving scattered radiation of $0^{th}$ diffraction order and use the one or more critical dimensions to model the amount of ordered scattered radiation characterized by a diffraction order other than zero.

25. The apparatus of claim 14, wherein the diffuse scattering module includes a processor operable to determine the amount of diffuse scattered radiation from bright field reflectometry measurements.

* * * * *